March 11, 1969    Z. J. ZEC    3,432,424
IMMUNOELECTROPHORESIS ANTISERUM STRIPS
Filed Aug. 23, 1965

ZVONIMIR JUAN ZEC
*INVENTOR.*

BY Louis Mok

ATTORNEY

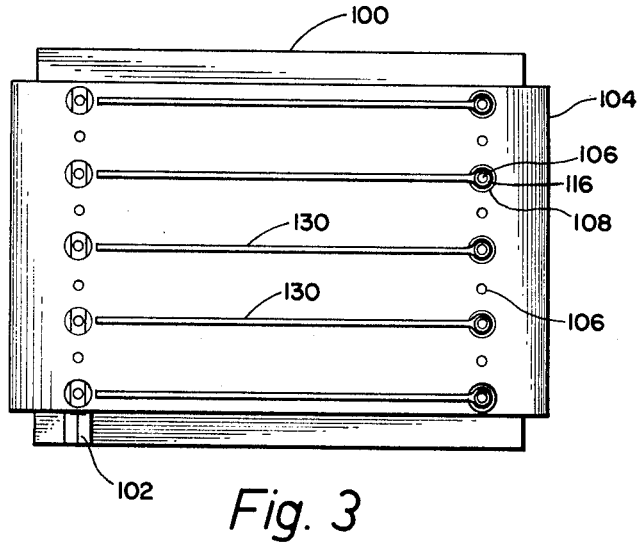
Fig. 3
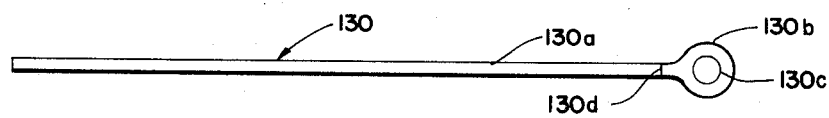
Fig. 4
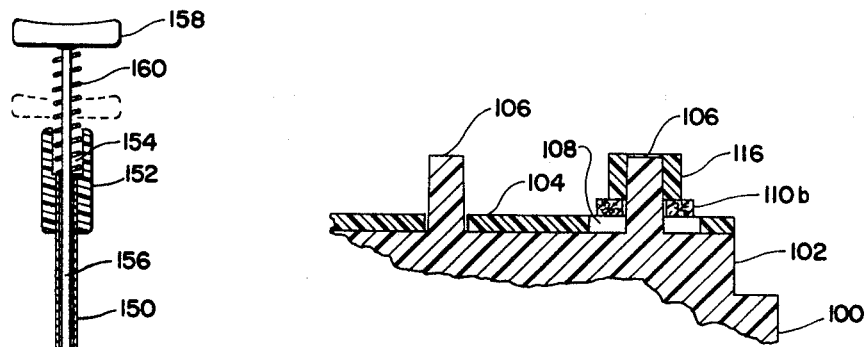
Fig. 5
Fig. 6
ZVONIMIR JUAN ZEC
INVENTOR.
BY
ATTORNEY United States Patent Office 3,432,424
Patented Mar. 11, 1969

3,432,424
IMMUNOELECTROPHORESIS ANTISERUM STRIPS
Zvonimir Juan Zec, Palo Alto, Calif., assignor to Beckman Instruments, Inc., a corporation of California
Filed Aug. 23, 1965, Ser. No. 481,837
U.S. Cl. 204—299
Int. Cl. B01k 5/00
10 Claims

ABSTRACT OF THE DISCLOSURE

A strip formed from a material capable of absorbing a substantial amount of a suitable antiserum is disposed on the surface of an electrophoresis support membrane and includes at least one end having a slot formed therein with the size of the slot being somewhat larger than the pin over which it fits to compensate for expansion of the strip upon application of the antiserum.

---

This invention relates generally to electrophoresis and particularly to immunoelectrophoresis, in which the separated components are determined by specific immune reactions after electrophoresis.

Immunoelectrophoresis, as applied to the separation and identification of blood serum components, is conducted generally by placing a quantity of serum on an electrophoresis support medium, electrophoretically separating the components, reacting the separated components with antiserum to form precipitins and then identifying the precipitins. The antiserum is typically applied to the support medium along a straight line. The subsequent diffusion of the antiserum results in the intersection of the antiserum diffusion patterns with the zones developed by the electrophoretic separation of the serum.

Although almost all immunoelectrophoretic studies to date have been supported on agar gels, cellulose acetate membranes offer several advantages over this meduim. These membranes are always ready for use, they are easily stored, relatively uniform, provide a permanent record and afford greater sensitivity.

Apparatus for mounting the support membrane may comprise generally a bridge element having two rows of upwardly projecting pins. One row is located near one end of the bridge element and the other row is located near the opposite end. A plurality of holes is provided in the membrane to receive the two rows of pins.

Although cellulose acetate membranes are advantageous in many respects, special problems do arise. One problem is that the membranes are too thin to easily absorb the amounts of antiserum required for many reactions. To meet this problem, the use of filter paper strips, placed on the membrane to act as carriers for antiserum, was introduced. These strips not only make possible the initial application of antiserum, but also serve as reservoirs for standard quantities of antiserum during the period of diffusion.

Heretofore, filter paper strips were merely placed unsupported upon the membrane so that when saturated with antiserum, they tended to curl from the initially straight configuration and to lift, at certain points, away from the cellulose acetate membrane underneath, thus causing air spaces to form. The preceding phenomena caused distorted diffusion patterns and non-uniform absorption of the antiserum by the strips. In addition, the anti-serum diffused from the ends of the strips thereby leaving on the strip an unknown amount of antiserum to participate in the reactions. One consequence was that results lacked repeatability.

Accordingly, it is an object of this invention to provide an improved antiserum strip for holding a known volume of antiserum, which strip provides uniform, repeatable and undistorted diffusion patterns.

It is a further object of this invention to provide a combination antiserum strip and immunoelectrophoresis support membrane whereby distortion of the antiserum diffusion pattern is substantailly eliminated.

It is a more specific object of this invention to provide an improved antiserum strip for holding a known volume of antiserum, which strip retains its linear shape after saturattion with antiserum and which remains in contact with the support membrane underneath along the entire length of the strip.

According to one specific, exemplary form of the present invention shown and described herein, there is provided an antiserum strip adapted to absorb and hold a given quantity of antiserum fluid and which may be anchored to the pins of a bridge element upon which is mounted an electrophoresis support membrane. Restraining or clamping means may be provided to hold the anchored ends of the strip in place on the pins. The ends of the strip affixed to the bridge element may be made non-wettable to prevent antiserum from reaching the bridge pins holding the strip. Further, the holes in the electrophoresis support membrane receiving the bridge pins to which the strip is anchored may be enlarged to serve as a further barrier to prevent the antiserum from reaching the pins.

The novel features which are believed to be characteristic of the invention are set forth with particularity in the appended claims. The invention itself, however, together with further objects and advantages thereof, can best be understood by reference to the following description taken in connection with the accompanying drawings in which:

FIGURE 3 is a plan view of the apparatus of FIGURE 1 in which alternative forms of the antiserum strips and the cellulose membrane are utilized;

FIGURE 4 is a plan view of the alternative form of the antiserum strip;

FIGURE 5 is an end view, in section, of a portion of the apparatus of FIGURE 2 taken along planes 5—5; and FIGURE 6 is a side view, in section, of a tool which may be used in conjunction with the present invention.

Figure 1:
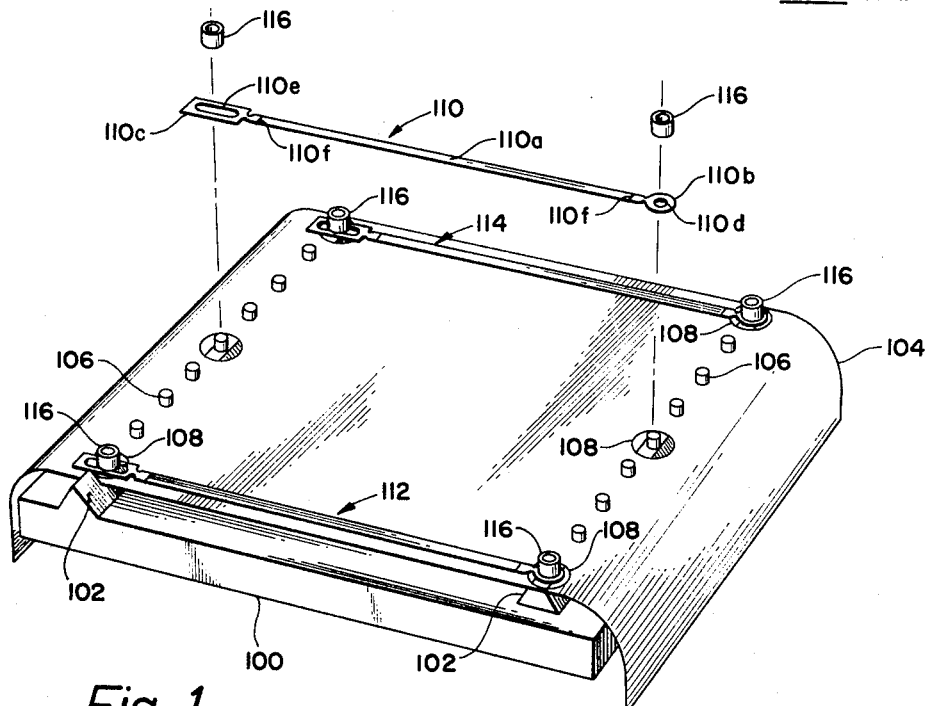
FIGURE 1 is a partially exploded, perspective view showing a simplified bridge element upon which is mounted an electrophoresis support mmebrane and antiserum strips in accordance with the present invention.
Figure 2:
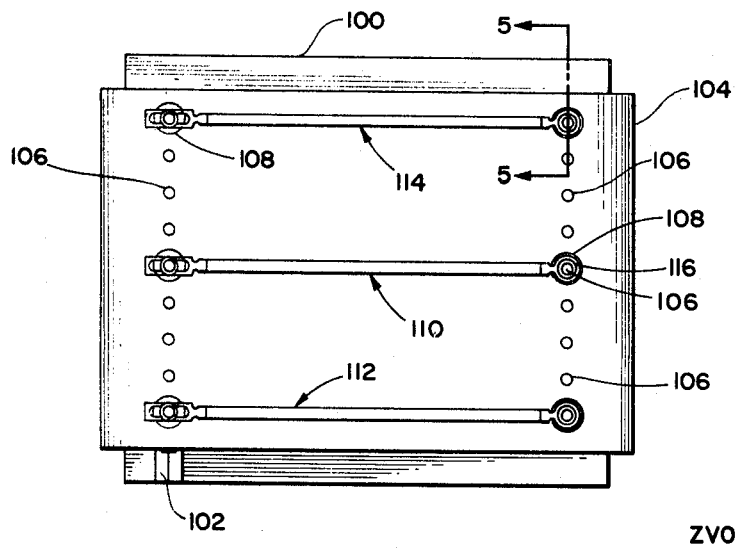
FIGURE 2 is a plan view of the apparatus of FIGURE 1.

Referring now to drawings, there is shown in FIGS. 1 and 2 perspective and plan views of a portion of a typical zone electrophoresis apparatus. A base in the form of a bridge element 100, having a pair of transverse mounting projections 102, serves to hold in place an electrophoresis support medium such as a cellulose acetate membrane 104. The membrane 104 is saturated with a buffer solution having the proper pH to provide a conductive medium in which the electrophoretic separation can take place. The extremities of the membrane 104 depend into electrolyte cells (not shown) which serve to connect the buffer-saturated membrane 104 with a source of D.C. electrical power (not shown).

Two rows of pins, projecting upwardly from the transverse mounting projections 102, are provided to locate and hold the support membrane 104. The individual pins are designated by the reference numeral 106. The support membrane 104 has two rows of holes which receive the pins 106. It will be seen that according to the embodiment depicted in FIGS. 1 and 2, the membrane 104 may be provided with several enlarged holes 108, through which corresponding pins 106 project. The purpose of the enlarged holes 108 will be described below.

Overlying the membrane 104 are one or more absorbent strips with function generally as reservoirs during the diffusion period and hold given volumes of antiserum. The apparatus illustrated in FIGS 1 and 2 shows the use of three strips 110, 112 and 114. Any number of strips may be used, the number depending upon various factors such as the capacity of an individual strip, the width of the membrane and the pattern of zones developed during the electrophoresis run.

In FIG. 1, the middle strip 110 is shown lifted from the surface of the membrane 104 to facilitate an understanding of the description which follows. The strip 110 generally comprises an intermediate portion 110a which joins a round end 110b and a rectangular end 110c. The rounded end 110b is provided with a circular hole 110d dimensnoned to fit easily over the appropriate pin 106. The end 110c may be provided with a slot-shaped opening 110e, the width of which allows the corresponding pin 106 to easily pass therethrough. The purpose of the slot-like opening 110e is to permit expansion of the strip 110 when wet thereby assuring that the strip will lie flat on the membrane 104 at all times thus providing uniform aud complete contact between the under surface of the strip 110 and the upper surface of the membrane 104 along virtually the entire length of the strip.

To help prevent antiserum from diffusing out onto the the membrane from the ends of the strip, and causing haphazard and unpredictable results, the ends 110b and 110c may be made non-wettable. Non-wettable ends also serve another purpose: since it is normally necessary to know exactly the volume of antiserum held by the intermediate portion from which portion the diffusion patterns emanate, the flowing of antiserum from the intermediate portion of the strip to the ends must be prevented since such flow leaves an unknown amount of antiserum in the intermediate portion.

The ends 110b and 110c of the strip 110 may be made non-wettable in various ways. The strip, of course, may be fabricated in three sections in which the intermediate portion 110a is made of an appropriate absorbent material such as filter paper and the ends are made of a suitable non-wettable material such as plastic. A simple and effective approach is to fabricate the entire strip from an absorbent material such as filter paper and to impregnate the ends with a wax or paraffin compound. The lines 110f on the strip 110 indicate the approximate locations of the extremities of the non-wetting portions.

As an additional safeguard against antiserum accumulating at the pins 106 by seeping from the intermediate portion 110a toward the pins 106 between the contacting surfaces of the strip 110 and the membrane 104, the membrane 104 may be provided with enlarged holes 108 at those pins anchoring the antiserum strips. It will be seen that any antiserum seeping toward the pins 106 between the contacting surfaces of the strip and the membrane will be stopped at the edges of the enlarged holes 108. As shown in FIGS 1 and 2, the diameter of the enlarged holes 108 preferably exceeds slightly both the diameter of the rounded end of the strip and the width of the rectangular end.

When the dry filter paper strips are placed on the wet membrane, the strips, especially those which are wider and therefore capable of holding greater volumes of antiserum, may have a tendency to ripple or curl thereby losing contact at various points with the underlying membrane. In addition, the antiserum applicator, which may be in the form of a pipette or the like, can drag the strips out of place, unless they are secured. FIGS. 1, 2 and 5 depict clamping or restraining means in the form of resilient sleeves 116, fabricated of plastic or rubber or the like, which may be utilized to hold the strips down on the membrane by preventing the ends from lifting off the pins 106. The sleeves 116 are slipped over the appropriate pins 106 and securely held thereby. The sleeves 116 may be applied to the pins 106 manually or in any other convenient manner. A tool which may be used for this purpose is described below.

Turning now to FIGS. 3 and 4, there is shown an embodiment of the present invention in which alternative forms of the antiserum strip and support membrane are utilized. It may be seen that the alternative antiserum strip, designated generally by the reference numeral 130, includes a narrow, elongated free portion 130a extending from a single end 130b having a circular hole 130c for receiving one of the bridge pins 106. Antiserm is applied to the elongated portion 130a which may be made of an absorbent material such as filter paper. To prevent antiserum from reaching the bridge pin 106, the end 130b may be made of a suitable non-wettable material such as plastic or preferably, the entire strip may be fabricated of an absorbent material and the end 130b impregnated with a wax or paraffin compound. The line 130d indicates the approximate position of the edge of the wax or paraffin impregnated portion.

The antiserum strips of FIGS. 3 and 4 require only one secured end because they are narrower than the double-ended strips, being utilized where smaller antiserum loads are necessary. For example, whereas the double-ended strips may range in width from about 1.5 mm. to 3.5 mm. and hold for about 30 $\mu$l. to 80 $\mu$l. of antiserum, the narrower, single-ended strips may range from approximately 0.5 mm. to 1.3 mm. in width and hold from about 15 $\mu$l. to 30 $\mu$l. of antiserum. Because of their smaller size, there is virtually no tendency for the single-ended strips to lift off the membranes after saturation. However, the possibility of dragging these strips out of line by the applicator remains, so that one end is secured.

During application of the antiserum, alignment of the narrower strips may be maintained in any desired manner. An apparatus especially suited for the application of antiserum to the narrow, single-ended strips is described in the copending application of Z. J. Zec, Ser. No. 469,214, filed July 2, 1965, entitled "Antiserum Applicator," and assigned to Beckman Instruments, Inc. The applicator delivery conduit of the copending application has an inverted V-shaped or forked tip adapted to straddle the strip, thus guiding the strip into a straight path while saturating it with antiserum. As with the double-ended strip, the end of the single-ended strip may be held in contact with the membrane by means of a sleeve 116 slipped over the bridge pin 106 and the hole in the cellulose acetate membrane 104 underneath the end of the strip may be enlarged as a further precaution against antiserum reaching the bridge pin.

FIG. 6 shows a simple tool which may be used to place the sleeve 116 over the pin 106. The tool comprises a tubular element 150 which is secured at its upper end in, and extends downwardly from, a housing 152. The housing 152 has an upwardly extending recessed portion 154. A rod 156, having a diameter slightly larger than the sleeve 116, is held by the tube 150, the diameter of the tube 150 being such that the rod 156 may easily slide inside the tube. The upper end of the rod 156 projects from the housing 152 and terminates in a push-button 158. A spring 160 is interposed between the lower surface of the button 158 and the bottom of the recess 154 in the housing 152. In operation, the housing 152 may be conveniently held between the index and middle fingers while the thumb is used to depress the push-button 158 against the opposing force of the spring 160 thereby causing the lower end of the rod 156 to project from the lower end of the tube 150 as indicated by the dotted lines. A sleeve 116 may then be slipped over the protruding end of the rod 156 and applied to the desired pin 106. The device of FIG. 6 is especially useful in conjunction with apparatus such as disclosed in the above-referenced copending application in which the pins may be reached only through an opening of limited size.

It will be obvious to those skilled in the art that various modifications may be made to the specific exemplary embodiments of the invention described. While particular embodiments have been discussed it will be understood that the invention is not limited thereto and that it is contemplated to cover any such modifications in the appended claims as fall within the true spirit and scope of the invention.

What is claimed is:

1. A combination of a strip of material capable of easily absorbing an antiserum, an electrophoresis support membrane, and a bridge element, said membrane having mounting holes receiving pins projecting from the bridge element and said strip being disposed on the surface of said membrane and held by one of said pins, in which said strip has at least one enlarged end having a hole receiving one of said bridge pins;

said strip has a narrow, elongated free portion extending from said end; and, said hole in said membrane which receives said pin holding said strip is substantially larger than said pin, whereby the edge of said hole does not contact said pin.

2. A combination as defined in claim 1 in which
said end of said strip is non-wettable; and
said elongated free portion is wettable.

3. A combination as defined in claim 2 in which
said strip is made of filter paper and said non-wettable end is paraffin-impregnated.

4. A combination as defined in claim 3 which further includes
means attached to said pin for retaining said non-wettable end of said strip on said pin.

5. A combination of an antiserum strip, and electrophoresis support membrane, and a bridge element, said membrane having mounting holes receiving pins projecting from said bridge element and said strip disposed on said membrane and held by two of said pins, in which said strip has a first end having a hole receiving a first pin;

said strip has a second end having a slotted opening receiving a second pin located across said bridge;

said strip has an intermediate portion joining said ends; and.

said holes in said membrane which receive said pins holding said strips are enlarged whereby the edges of said holes do not contact said pins.

6. A combination as defined in claim 5 in which
said first and second ends are non-wettable; and,
said intermediate portion is wettable.

7. A combination as defined in claim 6 in which
said strip is made of filter paper and said ends are paraffin-impregnated.

8. A combination as defined in claim 7 which further includes
means attached to said pins for retaining said non-wettable ends of said strip on said pins.

9. A strip formed of a material capable of easily absorbing an antiserum for placing on an electrophoresis support membrane held in place on a bridge element by means of pins projecting from said bridge element, comprising:

a first end formed of a non-wettable material and including a hole for receiving a first pin on said bridge element, a second end formed of a non-wettable material and having a slot shaped opening for receiving a second pin located across from said first pin on said bridge element, the size of said slot opening being sufficiently greater than the size of said pin to permit the strip to expand when wettened without wrinkling and;

an intermediate portion joining said ends, said intermediate portion being formed of a wettable material.

10. An antiserum strip as defined in claim 9 in which said strip is made of filter paper and said ends are paraffin-impregnated.

References Cited

UNITED STATES PATENTS

| 2,768,948 | 10/1956 | McDonald et al. | 204—180 |
| 2,834,729 | 3/1958 | Pickels et al. | 204—180 |
| 3,317,418 | 5/1967 | Zec | 204—180 |

OTHER REFERENCES

Marcinkiewicz et al., "Paper Chromatography and Chemical Structure," in Chromatographic Reviews, edited by Lederer, vol. 5, 1963, p. 66.

Neher, "Chromatography of Sterols, Steroids, and Related Compounds," in Chromatographic Reviews, edited by Lederer, vol. 1, 1959, pp. 146–148.

ROBERT K. MIHALEK, *Primary Examiner.*

E. ZAGARELLA, *Assistant Examiner.*

U.S. Cl. X.R.

204—180